United States Patent [19]

Okamoto et al.

[11] Patent Number: 4,816,872

[45] Date of Patent: Mar. 28, 1989

[54] AUTOMATIC COPYING MACHINE

[75] Inventors: Yuji Okamoto, Nara; Katsuyoshi Fujiwara, Osaka, both of Japan

[73] Assignee: Sharp Kabushiki Kaisha, Osaka, Japan

[21] Appl. No.: 69,157

[22] Filed: Jul. 2, 1987

[30] Foreign Application Priority Data

Jul. 4, 1986 [JP] Japan ................................ 61-158346

Aug. 6, 1986 [JP] Japan ................................ 61-185787

[51] Int. Cl.$^4$ ................................................ G03B 27/52

[52] U.S. Cl. ......................................... 355/23; 355/24; 355/14 SH; 355/26

[58] Field of Search .............. 355/3 SH, 14 SH, 14 R, 355/23, 24, 26; 271/3.1

[56] References Cited

U.S. PATENT DOCUMENTS 4,210,319 7/1980 Hynes .................................. 271/3.1

FOREIGN PATENT DOCUMENTS 55-156964 12/1980 Japan .................................... 355/23

*Primary Examiner*—L. T. Hix

*Assistant Examiner*—D. Rutledge

*Attorney, Agent, or Firm*—Birch, Stewart, Kolasch & Birch

[57] ABSTRACT

The duplex copying machine according to the present invention is arranged to copy both faces of an original document onto both faces of copy papers in such manner that the front and the reverse surfaces of the original document are copied correspondingly onto those of the copy papers, without inconsistency of the copied surfaces, even when paper jamming is given rise to in the course of the operation under the verso copying mode.

Further, the duplex copying machine according to the present invention has such function as to positively classify the copy papers subsequent to the jammed paper into respective proper bins.

3 Claims, 11 Drawing Sheets

AUTOMATIC COPYING MACHINE

BACKGROUND OF THE INVENTION

1. Field of the Invention

The present invention generally relates to an automatic copying machine which is arranged to copy the front surface of an original document onto the front surface of a copy paper, and the reverse surface of the original document onto the reverse surface of the copy paper which is already copied on the front surface thereof, and more particularly, to an automatic duplex copying machine for copying both surfaces of different original documents onto both surfaces of copy papers successively in such a manner that the front surface and the reverse surface of an original document are copied correspondingly onto the front surface and the reverse surface of a copy paper even when paper jamming takes place during the copying operation.

2. Description of the Prior Art

Generally, in order to copy onto both sides of a copy paper or a plurality of sheets of copy paper, the number of which is corresponding to a predetermined set number of copies (the set number of copies to be produced), the sheets are copied first on the front surfaces thereof, temporarily stored in an intermediate tray, and then copied onto the reverse surfaces thereof. In the automatic copying machine described above, in the case where copy papers happen to be jammed in the course of a copying operation onto the reverse surfaces thereof, the jammed papers are removed, resulting in a difference in the number of papers. In other words, the number of copy papers which are actually copied onto both surfaces thereof becomes smaller than the set number of copies to be produced. Noting the above fact, therefore, it has been so arranged in the prior art copying machine to detect the discordance or the difference in the number of copy papers copied on the front surfaces from copy papers copied on the reverse surfaces, thereby to obtain the insufficient number of copies generated because of an abnormal condition such as paper jamming during the copying operation onto the reverse surfaces of copy papers. When the number of copies is short, copying is carried out again onto the copy papers by the insufficient number of copies.

According to the above described prior art copying machine, however, a plurality of original documents having both surfaces printed should be copied onto respective both sides of copy papers with the employment of an automatic document feeder, and if the paper jamming takes place in the verso copying operation with respect to a particular original document, the recto copying operations are carried out more times than the verso copying operations. This is because the copying machine with the automatic document feeder is arranged first to carry out the recto copying operations successively by the set number of copies for each original document, and then to carry out the verso copying operations by the set number of copies for each original document after drawing out the recto-copied copy papers from the intermediate tray. Therefore, if the paper jamming or the like happens in the verso copying operation with respect to a halfway original document, the copy paper which should be copied with the verso of a coming original document is undesirably copied with the verso of an original document precedent to the coming original document, resulting in discordance of the copied surfaces of the original document and the copy paper.

SUMMARY OF THE INVENTION

Accordingly, an essential object of the present invention is to provide an improved automatic duplex machine for copying onto both surfaces of copy papers with respect to a plurality of original documents, which is so arranged that, even when paper jamming or the like takes place in the course of the copying operation onto the reverse surfaces of copy papers with respect to a particular original document, copying with respect to the succeeding original documents can be positively carried out in such a manner that the front and the reverse surfaces of the original, document are copied correspondingly onto the respective front and reverse surfaces of copy papers.

In accomplishing the above-described object, according to the present invention, there is provided an automatic duplex copying machine which performs, during the copying operation onto both surfaces of copy papers, the recto copying mode and the verso copying mode. In the recto copying mode, the front surface of an original document is copied onto the front surface of a copy paper which is then stored in an intermediate tray. This sequence of operations, namely, the recto copying operation, is repeated for every original document by the set number of copies. In the verso copying mode, after completion of the above-described recto copying mode, the reverse surface of the original document is copied onto the reverse surface of the copy paper stored in the intermediate tray, which copy paper is thereafter discharged. The sequence of operations, namely, the verso copying operation, is repeated for every original document by the set number of copies in the verso copying mode.

The automatic copying machine of the present invention is comprised of a first counter which calculates the remaining number of copies yet to be produced for each original document, a second counter which calculates the remaining number of supply of copy papers yet to be supplied from the intermediate tray during the operation in the verso copying mode, and a selection means which selects the contents of the first counter for the content of the second counter when paper jamming occurs in the copying operation under the verso copying mode.

FIG. 1 schematically shows the structure of the automatic duplex copying machine according to a first embodiment of the present invention.

Referring to FIG. 1, a cassette 1 supplies copy papers to a copy processing unit 2. At this time, the copying machine is set in the recto copying mode. The front surface of an original document is copied onto the front surface of a copy paper in the copy processing unit 2, and the copied front surface of the copy paper is fixed at a fixing part 3 to be conveyed to an intermediate tray 4. The aforementioned series of operations is repeated by the set number of copies to be produced in the recto copying mode. After the recto copying operation is repeated for every original document by the set number of copies, the verso copying mode is started. In entering the verso copying mode, the copy paper stored in the intermediate tray 4 is sent out by a paper feeding roller 10 to be supplied to the copy processing unit 2. The copy paper is copied onto the reverse face thereof with the reverse face of the original document in the copy processing unit 2 and fixed in the fixing part 3, and then discharged into a paper discharge tray. The sequence of operations is repeated by the set number of copies in the verso copying mode. A first counter Y calculates the remaining number of copies yet to be produced for one original document, while a second counter YDD calculates the remaining number of supply of copy papers yet to be supplied from the intermediate tray for one original document.

Explanation will be given of the operation of the automatic duplex copying machine having the above-described construction with reference to FIG. 1.

When the automatic copying machine is set in the recto copying mode, the copy paper supplied from the cassette 1 is transferred with an image the front surface thereof in the copy processing unit 2, and then fixed in the fixing part 3. Thereafter, the copy paper is sent to be stored in the intermediate tray 4. This copying operation in the recto copying mode is repeated for the set number of copies. In the meantime, the first counter Y is set with the set number of copies every time the recto copying mode is practiced for original document. When a paper detection sensor S2 (FIG. 4) generates an on-signal during the operation in the recto copying mode, the first counter Y counts down to calculate the remaining number of the set number of copies.

In the verso copying mode, the copy papers temporarily stored in the intermediate tray 4 are transferred one after another by the paper discharge roller 10 to the copy processing unit 2, such that the copy papers have their reverse surfaces copied with the reverse surface of the original document. After the copy papers are fixed at the fixing part 3, they are discharged to the paper discharge tray. The verso copying operation as described above is repeated by the set number of copies. The second counter YDD is set, in the same manner as the first counter Y, with the set number of copies every time the recto copying operation is performed for every original document. The content of the second counter YDD is counted down every time a copy paper is supplied by the paper feeding roller, such that the remaining number of the set number of copies to be produced is calculated. During the copying operation in the verso copying mode, the content of the first counter Y is set to be the set number of copies, and at the same time counted down by an on-signal of a paper detection sensor S1 provided before the paper discharge tray, so that the verso copying operation onto the copy papers in the intermediate tray is repeated by the set number of copies. In other words, the first counter Y calculates the remaining number of the set number of copies also in the verso copying mode.

In the case where the copy papers are not transferred to the copying processing part 2 because of the paper jamming or the like during the operation in the verso copying mode, the content of the first counter Y is set to be the value of the second counter YDD. Specifically, the remaining number of the set number of copies to be produced is calculated by the content of the first counter Y in the verso copying operation as in the recto copying operation. However, in the case where copying is not carried out in the verso copying operation due to the paper jamming, etc., the content of the first counter is not counted down because of the copy papers which are counted by the second counter although the second counter counts down when the copy papers for the verso copying operation are supplied, and accordingly, if the content of the first counter is set to be the value of the second counter, the remaining number of the set number of copies in the verso copying mode can be correctly obtained. Therefore, even when the jammed copy papers are removed, it is regarded that the verso copying mode is practiced, and in consequence, the verso copying operation with respect to the original document appears to be carried out by the same number of copies as the recto copying operation.

As described hereinabove, in the copying machine of the present invention, the first counter Y is so arranged that, even when the verso copying operation is not carried out because of the paper jamming, the correct remaining number of the set number of copies is maintained, thereby keeping the right condition for copying of an original document onto a copy paper. As shown in FIG. 2, for example, supposing that the set number of copies is 4, and copy papers copied in the recto copying mode with respect to four original documents are stored in the intermediate tray 4, the 16 sheets of copy papers are subjected to the verso copying mode one by one from the uppermost sheet. The set number of copies in the verso copying mode for every original document which is rendered the same as the set number of copies in the recto copying mode is entered into the first counter Y. The first counter Y counts down by the on-signal generated from the paper detection sensor S1 provided before the paper discharge tray so as to calculate the remaining number of the set number of copies in the verso copying operation.

However, in the case, for example, where the copy paper represented by ③ in FIG. 2 which has the front surface thereof copied with the front face of the fourth original document is not copied on the reverse face thereof due to the paper jamming, it is so arranged that the paper jamming is detected, and at the same time, the content of the first counter Y is set to be the content of the second counter YDD. In other words, if the paper jamming is given rise to, although the content of the counter Y remains "3" since the paper detection sensor S1 is not turned on because of the jammed copy paper ③, the second counter YDD counts down while the copy papers are supplied in the verso copying operation, to calculate the remaining number "2" of copy papers yet to be supplied from the intermediate tray. As a result, the remaining number "2" in the second counter YDD is set in the first counter Y to be "2". This renewal of the content of the first counter Y means that the first counter Y counted the copy paper which could not be subjected to the verso copying operation due to the paper jamming.

Thus, even though the verso copying operation with respect to the fourth original document is carried out by the number smaller than the set number of copies, the first counter Y is set at that time to be the content of the second counter YDD. Accordingly, the first counter Y can be renewed to be the remaining number "2" for one original document. As a result, thereafter, the verso copying operation is conducted based on the content of the first counter Y, namely, the remaining number "2". When the copy papers represented by ① and ② in the intermediate tray 4 which have their front surfaces copied with the fourth original document are finished with the verso copying operation, the first counter Y shows the remaining number "0". At this time, when the first counter Y shows "0", it is the time to wait for a third original document. When the third original document is placed on the platform for the verso copying operation, the first counter Y is set to be the set number 4 for the third original document. In the manner as described above, even when the paper jamming is brought about in the verso copying operation, the automatic duplex copying machine according to the present invention can be prevented from being affected in the copying operation thereafter.

In the above-described arrangement of the present invention, the content of the first counter which calculates the remaining number of the set number of copies for each original document is rendered the set number of the second counter which calculates the number of supply of copy papers from the intermediate tray when a jammed copy paper cannot be subjected to the verso copying mode. Consequently, even when the verso copying mode with respect to the original document is not carried out by the set number of copies due to the paper jamming, the first counter Y counts the set number of copies to be produced for one original document in the same manner as in the case without the paper jamming. Therefore, a plurality of original documents can be advantageously positively copied one by one by the set number of copies in such manner that the front surface of the original document is positively copied onto the front surface of the copy papers, and the reverse surface of the original document is positively copied onto the reverse surface of the copy papers, with no discordance of the surfaces to be copied between the original document and the copy papers.

A further object of the present invention is to provide an improved automatic duplex copying machine equipped with a sorter for copying a plurality of original documents onto both surfaces of copy papers which copy papers are in turn received in layered bins, wherein, in spite of the paper jamming caused during the copying operation onto the reverse surface of a copy paper, copying can be effected in correct correspondence of the surfaces between the succeeding original documents and the copy papers, and at the same time, even when the duplex copied copy papers are not discharged due to the paper jamming or the like, copy papers successive to the jammed copy papers can be positively classified in the proper bins in accordance with the sorting mode and the group mode set in a control part.

In accomplishing the above-described object, the automatic duplex copying machine according to the present invention performs the recto copying mode whereby the front surface of an original document is copied onto the front surfaces of copy papers which are then stored in the intermediate tray, which sequence of operations is repeated for every original document by the set number of copies to be produced, and, the verso copying mode whereby, after the above-described recto copying mode is completed, the reverse surface of the original document is copied onto the reverse surfaces of the copy papers stored in the intermediate tray, and then the copied copy papers are discharged, which sequence of operations is repeated for every original document by the set number of copies to be produced, in the duplex copying mode.

Moreover, the automatic duplex copying machine of the present invention is provided with a selection means for selecting the sorting mode whereby the duplex-copied copy papers are put into the proper bins one by one for every page, and the group mode whereby the duplex-copied copy papers are accommodated into proper bins for every original document by the set number of copies.

The automatic duplex copying machine further includes a first counter for calculating the remaining number of copies to be produced for each original document, a second counter for calculating the remaining number of supply of copy papers to be supplied from the intermediate tray in the operation under the verso copying mode, and a means which sets the content of the first counter to be the content of the second counter when the paper jamming takes place in the operation under the verso copying mode. Also provided in the automatic duplex copying machine is a shift means which sets the selected bin at the home position in the case where the sorting mode is selected, or shifts the selected bin to a next step in the case where the group mode is selected, when the content of the second counter to which the first counter is set is zero.

FIG. 6 schematically shows the structure of the automatic duplex copying machine with a sorter according to a second embodiment of the present invention.

Referring to FIG. 6, the explanation of the same structure as that in FIG. 1 will be abbreviated here, and the difference between FIGS. 6 and 1 will be described hereinbelow. When the verso copying mode is started, the copy papers stored in the intermediate tray are supplied by the paper feeding roller 10 to be forwarded to the copy processing unit 2 in which the reverse surface of the original document is copied onto the reverse surfaces of the copy papers. Then, after the copy papers copied onto the rear surfaces thereof are fixed at the fixing part 3, they are transferred to a sorter 23. In the sorting unit or the sorter 23, the duplex-copied copy papers are received into proper layered bins 6 in accordance with the sorting mode or the group mode preliminarily arranged in a control part (not shown). The above-described sequence of operations is repeatedly conducted in succession for every original by the set number of copies to be produced in the verso copying mode.

More specifically, in FIG. 6, in the operation under the verso copying mode, the copy papers temporarily stored in the intermediate tray 4 are sequentially sent out to the copy processing unit 2 by the paper feeding roller 10. In the copy processing unit 2, the reverse face of the original document is copied onto the reverse surfaces of the copy papers which are then fixed in the fixing part 3 and transferred to the sorter 23, so as to be classified into the layered bins 6 in accordance with the sorting mode or the group mode preliminarily set in the control part (not shown). In other words, in the case of the sorting mode selected, the duplex-copied copy papers are entered into the bins 6 one by one for every page. On the other hand, in the case of the group mode selected, the duplex-copied copy papers are brought into the bins 6 each by the set number of copies for every original document. Meanwhile, the set number of copies for every original document is set in the second counter YDD before start of the recto copying mode in the same manner as the first counter Y. The second counter YDD counts down before the copy papers are supplied by the paper feeding roller, thereby to calculate the remaining number of copies to be produced.

Furthermore, according to the automatic duplex copying machine, in the case where paper jamming is given rise to during the operation in the verso copying mode, the content of the first counter is set to be the content of the second counter, and at the same time, when the content of the first counter set in the above-described manner is zero, in other words, if the remaining number of the verso copying operations with respect to one original document is zero, the selected bin is set at the home position in the sorter 23 in the case of the sorting mode, or the selected bin is shifted to a next step in the sorter 23 in the case of the group mode.

In the manner as described above, if the paper jamming takes place during the operation in the verso copying mode, and when the verso copying operation with respect to the one original document is completed (namely, when the remaining number of the verso copying operations is zero), controlling of the sorter prevents the copy papers for a next original document from being stored into the bin which should have received the jammed copy papers, and accordingly the copy papers for the respective original documents are classified into the proper bins in accordance with the sorting mode or the group mode.

After the verso copying operation is completed, a third original document is set onto the platform, with the first and the second counters Y and YDD being set again with the set number "4" with respect to the third original document.

At this time, when the sorting mode is selected, the selected bin 6 is set at the home position by the sorter 23. If the group mode is selected, the selected bin 6 is shifted to a next step. Since the sorter 23 is not aware of the generation of the paper jamming within the copying machine, the bin will not be properly selected, without control of the sorter, when one original document is changed to another, resulting in that copy papers are mixed up within a bin. Therefore, by controlling the sorter as above, it can be prevented that copy papers for the next original document are mixed into the selected bin in which the jammed papers should have been contained, and the copy papers following the jammed papers are correctly received into the respective proper bins.

BRIEF DESCRIPTION OF THE DRAWINGS

These and other objects and features of the present invention will become apparent from the following description taken in conjunction with the preferred embodiments thereof with reference to the accompanying drawings throughout which like parts are designated by like reference numerals, and in which.

DESCRIPTION OF PREFERRED EMBODIMENTS

First Embodiment

Figure 3:
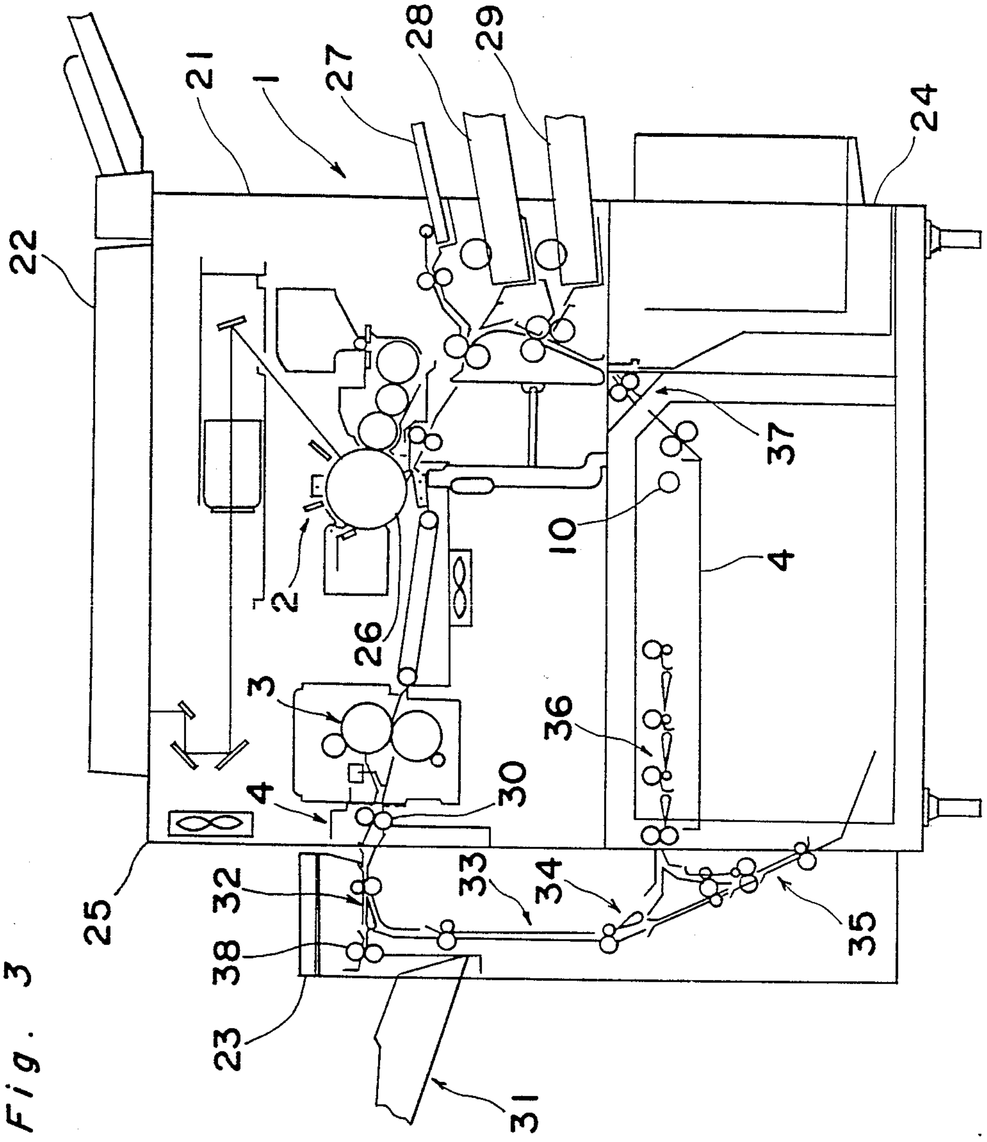
FIG. 3 is a view schematically showing the structure of the copying machine of FIG. 1.

Referring to FIG. 3, the structure of an automatic duplex copying machine according to a first embodiment of the present invention is schematically illustrated therein.

The automatic duplex copying machine is comprised of a main body 21, an automatic original document feeder 22, a sorter 23 and a cabinet 24. A platform 25 is provided on the upper surface of the main body 21. The automatic original document feeder 22 is placed over the platform 25 in order to transfer a plurality of original documents sequentially to a predetermined position on the platform 25. A photosensitive drum 26 is provided in the central part within the main body, constituting a copy processing unit 2. At the right side of the copy processing unit 2, there is formed a paper feeding part 1 in which a copy feeding tray 27 and paper cassettes 28 and 29 are installed. Further, at the left side of the copy processing part 2, a paper discharge part 4 provided with a paper discharge roller 30 is formed. A fixing roller 3 is placed between the paper discharge unit 4 and the copy processing part 2. Moreover, the main body 21 of the copying machine has an operating panel (not shown) arranged on the upper surface thereof.

The sorter 23 is equipped with a paper discharge tray 31. A flapper 32 provided within a paper transfer passage in the upper part of the sorter 23 introduces copy papers copied in the copy processing part 2 in the recto copying operation under the duplex copying mode into a passage 33 within the sorter through the paper discharge part 4. A paper reversing part 35 is arranged in the lower part of the sorter 23, and at the entrance of the paper reversing part 35 is provided a flapper 34. The flapper 34 is, although it generally leads the copy papers into the paper reversing part in the duplex copying mode, arranged to guide the copy papers directly to a transfer passage 36 within the cabinet 24, without passing them through the paper reversing part, in the composite copying mode. The main body 21 is mounted onto the cabinet 24. Moreover, the copying machine has an intermediate tray 4 inside the cabinet 24. The intermediate tray 4 is provided so as to temporarily store the copy papers transferred along the transfer passage 33 within the sorter 23 and the transfer passage 36 in the cabinet 24, to be supplied to the copy processing part 2 through a transfer passage 37. There is a paper feeding roller 10 above a paper feeding part of the intermediate tray 4, for supplying the copy papers stored in the intermediate tray 4 to the copy processing part 2 during the operation in the verso copying mode.

Figure 1:
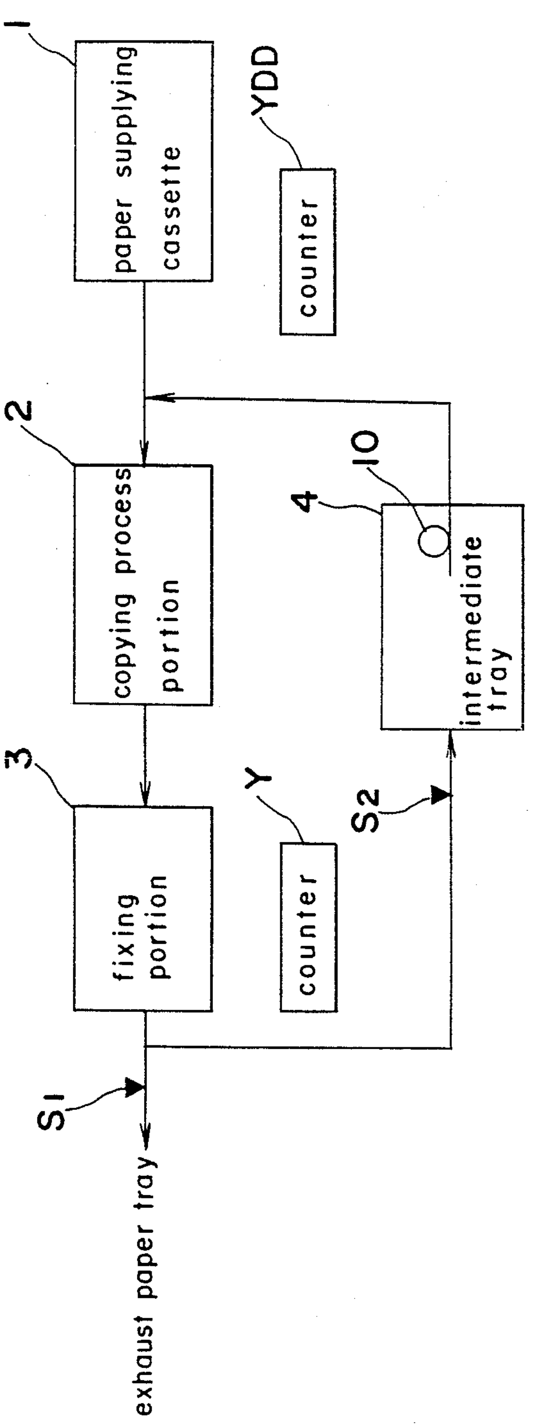
FIG. 1 is a block diagram schematically showing the structure of an automatic duplex copying machine according to a first embodiment of the present invention.
Figure 2:
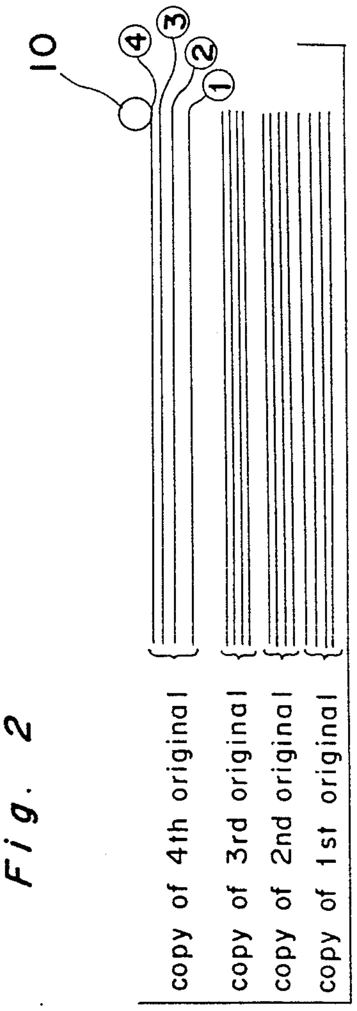
FIG. 2 is a view showing one example of an intermediate tray and copy papers stored therein of the copying machine of FIG. 1.

In the above-described copying machine, the copy paper fed from any one of the paper feeding tray 27, the paper feeding cassettes 28 and 29 is forwarded to the photosensitive drum 26 at a predetermined timing, such that a toner image on the surface of the photosensitive drum 26 is transferred onto the copy paper. After the copy paper is transferred onto the front surface thereof with the toner image, it is sent out to the fixing roller 3 to be fixed thereat. As described above, in the duplex copying mode, the copy paper the front surface of which is copied is sent into the sorter 23 by the paper discharge roller 30, through the transfer passage 33 in the sorter 23, the paper reversing part 35, and the transfer passage 36 in the cabinet 24, to be stored into the intermediate tray 4. The above-described recto copying operation is carried out when the desired number of copies which is inputted by the operating part (not shown) is set in a counter Y provided in the control part. After the number of copies is set in the counter Y, when the copied copy paper is detected by a paper detection sensor (S2 in FIG. 1) provided adjacent to the entrance of the intermediate tray, the counter Y counts down upon an on-signal of the sensor S2, thereby to calculate the remaining number of copies yet to be produced. The recto copying operation with respect to one original document is repeated until the calculated value becomes zero.

When the verso copying operation is started, the copy papers stored in the intermediate tray 4 are sent out one by one by the paper feeding roller 10 at a predetermined timing in a rightwise direction, and the copy papers are guided to the copy processing unit 2 through the paper transfer passage 37. There at the copy processing unit 2, the reverse surfaces of the copy papers are copied in the same manner as the front surfaces thereof.

The above-described verso copying operation is repeated until the counter Y in which the desired number of copies is set before start of the recto copying operation counts down the number, upon receipt of an on-signal from the paper detection sensor, to indicate the calculated value zero.

On the other hand, there is further provided a counter YDD in which the desired number of copies to be produced is set before start of the recto copying operation, and which is arranged to count down the number every time the copy paper in the intermediate tray 4 is supplied by the paper feeding roller. If paper jamming or the like occurs during the verso copying operation, the content of the counter Y is set to be the set number of copies set by the counter YDD, thereby to positively continue the verso copying operation. In the manner as described above, the verso copying operation is repeated by the set number of copies.

Figure 4:
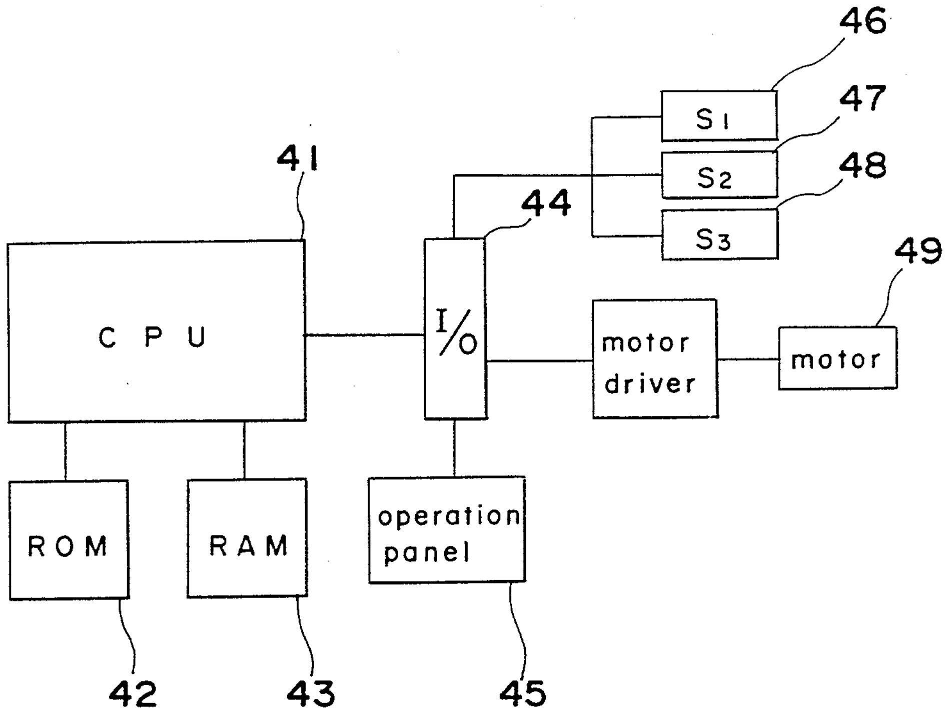
FIG. 4 is a block diagram of a control part of the copying machine of FIG. 3.

FIG. 4 is a block diagram showing the control part in the automatic duplex copying machine of FIG. 3. The control part is entirely controlled by the program of CPU 41. The controlling program is already written in ROM 42. RAM 43 is assigned with a flag for distinguishing the single copying mode and the duplex copying mode, or the recto copying mode and the verso copying mode in the duplex copying mode, or the RAM 43 is utilized for working area. Various kinds of inputting equipments are connected to I/O 44. The operation of CPU 41 controls each of input and output equipments which include an operating panel 45 provided with a mode selection key, a print key for indicating the start of the copying operation and a ten key, a paper detection sensor 47 (S2) which detects copy papers transferred to the intermediate tray in the recto copying mode, thereby to count down the content of the counter Y, a paper detection sensor 46 (S1) provided before a paper discharge roller 38 so as to detect the copy papers copied onto the reverse surfaces thereof to count down the content of the counter Y, a sensor 48 which counts down the value of the counter YDD by its detection signal every time the copy paper in the intermediate tray 4 is supplied by the paper feeding roller 10 in the verso copying mode, and a motor 49 for transporting the copy papers and driving the phtosensitive drum.

Figure 5A:
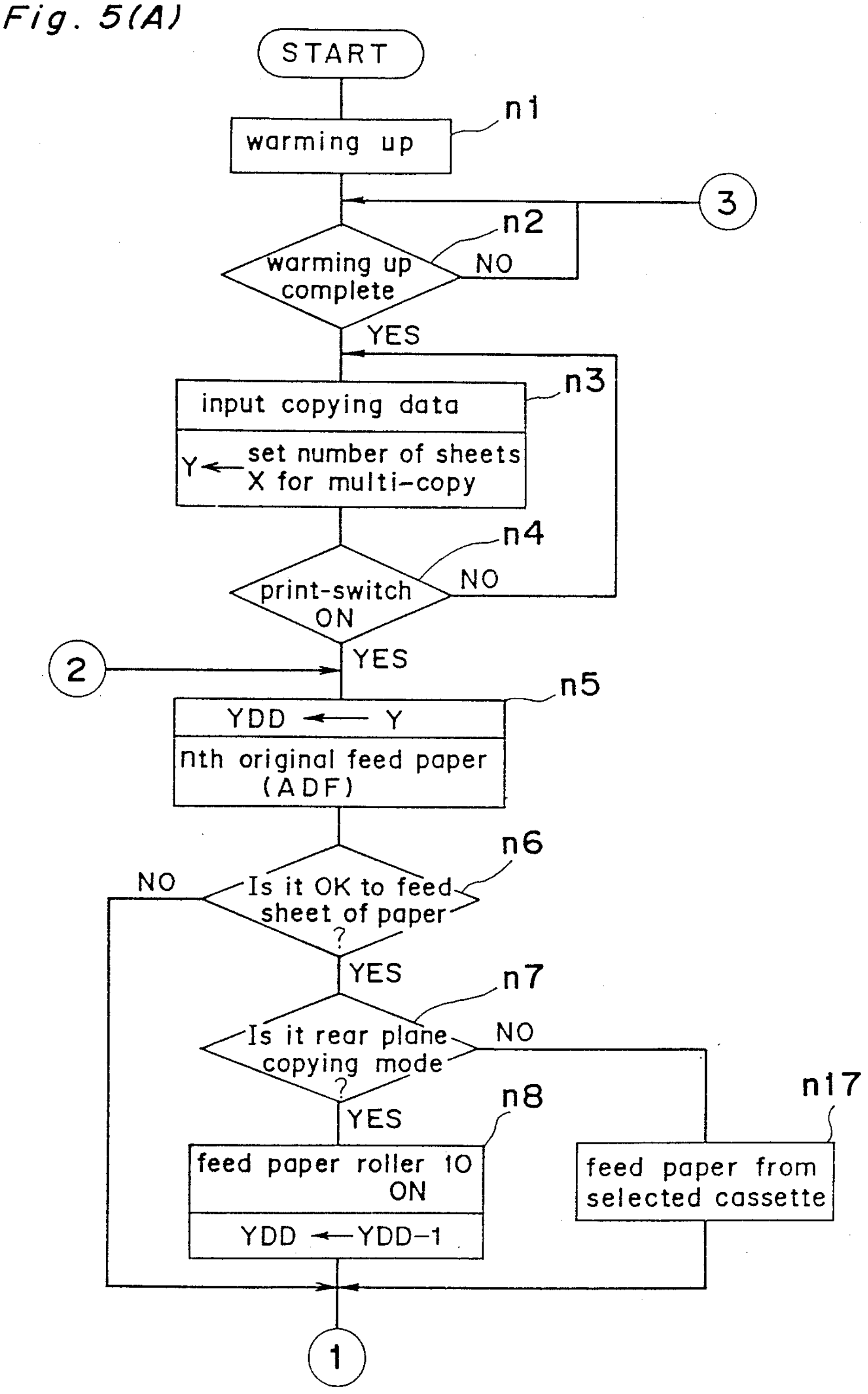
FIGS. 5(A) and 5(B) are flow-charts showing the operation of the copying machine of FIG. 3.
Figure 5B:
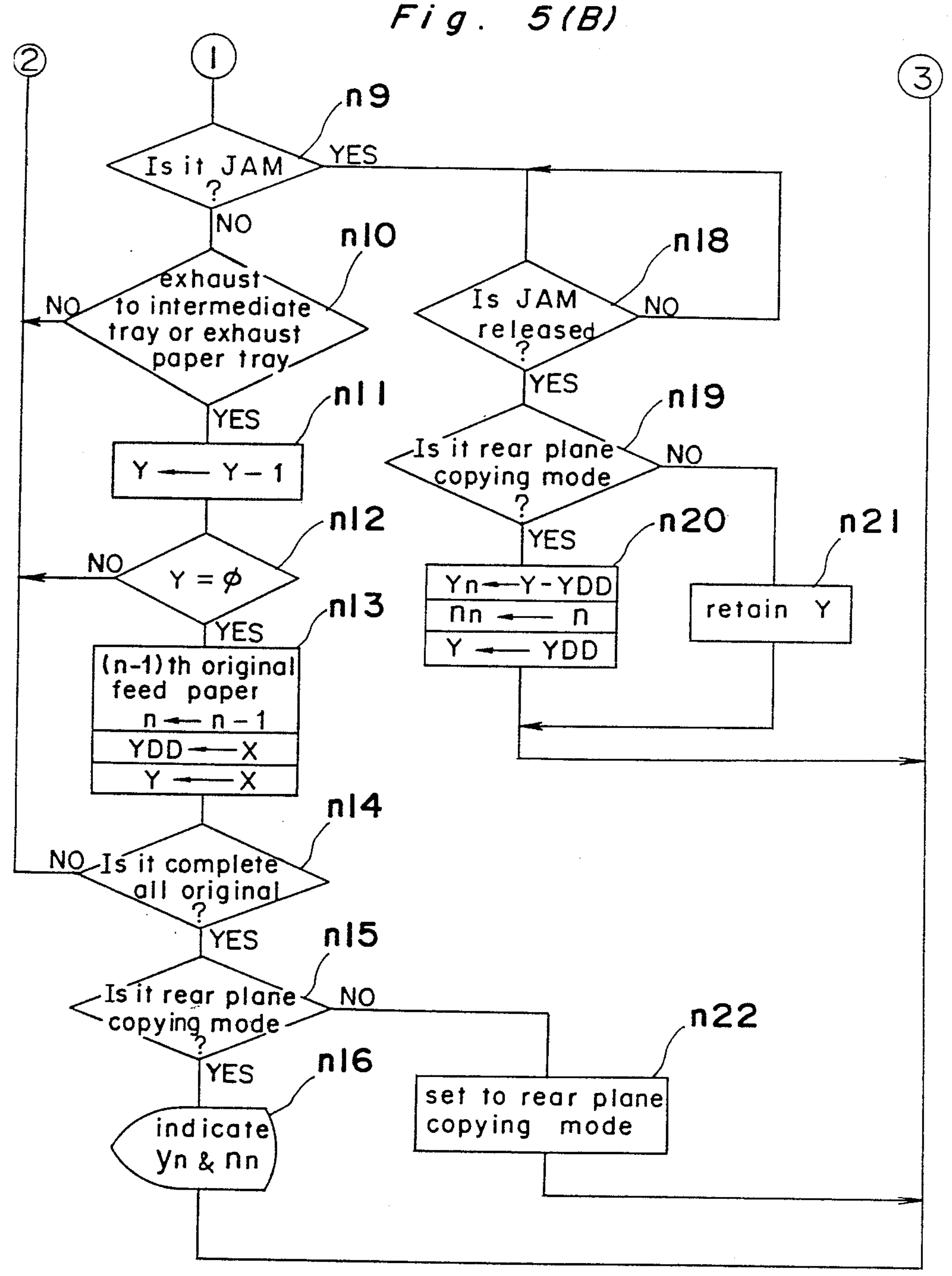
Figure 6:
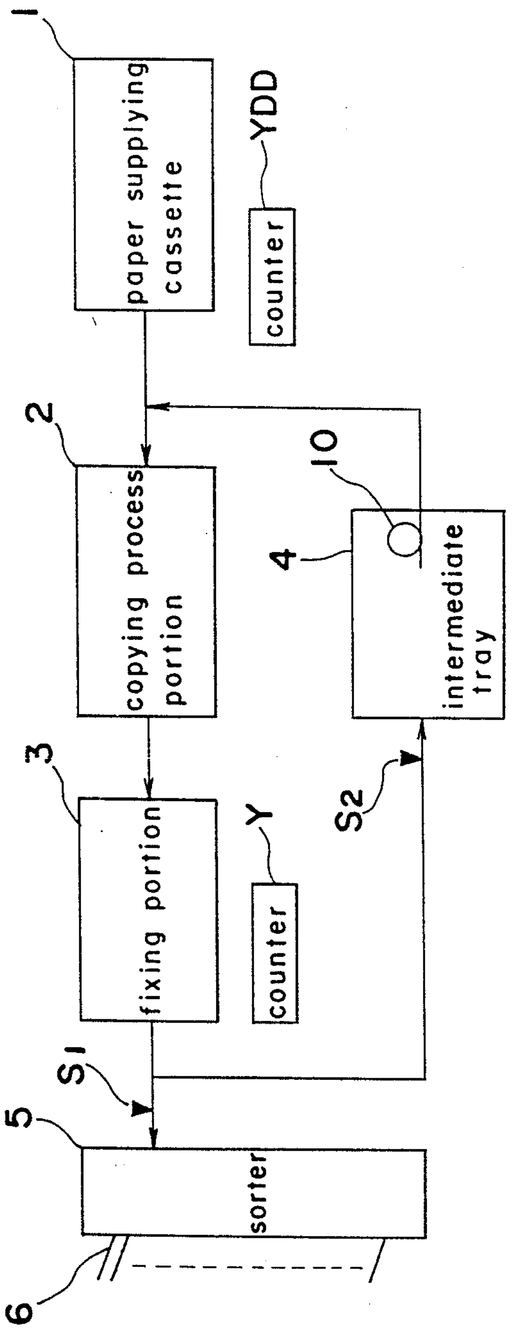
FIG. 6 is a block diagram schematically showing the structure of an automatic duplex copying machine with a sorting unit according to a second embodiment of the present invention.
Figure 7:
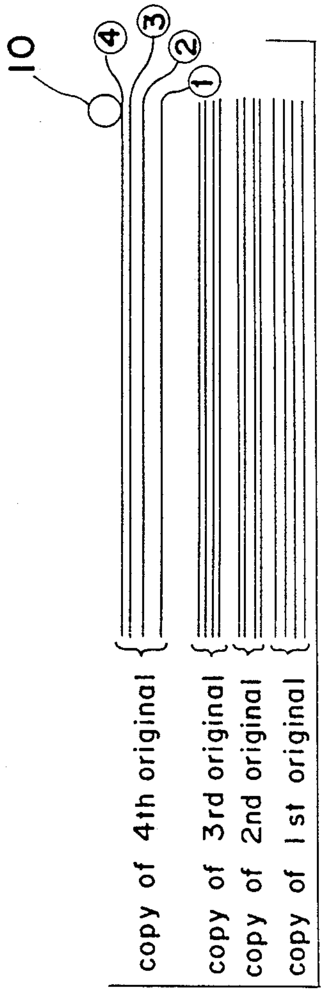
FIG. 7 is a view showing one example of an intermediate tray and copy papers accommodated therein in the copying machine of FIG. 6.

FIGS. 5(A) and 5(B) are flow-charts showing the operation of the copying machine in the duplex copying mode.

When power is supplied, the warming-up of the copying machine is started in step n1 (hereinafter the "step n1" will be referred only as to "n1"). After it is detected in n2 that the warming-up is finished, the data for copying is inputted in n3. The copying data contains the set number of copies desired to be produced per one original document which is set in the first counter Y. Then, the flow goes to n4 to wait for the turning-on of a printing switch.

When the printing switch is turned on in n4, the content of the counter Y is set in the counter YDD in n5 the value of which is decreased every time a copy paper is supplied from the intermediate tray in the operation of the verso copying mode, and at the same time an nth original document (at first n=1) is supplied from the automatic original document feeder 22 (referred to as ADF hereinbelow). In n6, it is detected whether the copy paper is properly supplied from the paper feeding part of the intermediate tray. If the paper is correctly supplied, it is judged in n7 whether or not it is in the verso copying mode at the present stage. When it is judged in n7 that the verso copying mode is selected, the flow proceeds to n8 where the paper feeding roller 10 is driven to supply to copy paper within the intermediate tray, and also to decrease the value of the counter YDD. It is detected in n9 whether the paper is jammed. Without the paper jamming observed in n9, the flow proceeds to n10 where it is detected whether the copy paper is discharged to the paper discharge tray. If the copy paper is not yet sent out to the paper discharge tray, the flow returns back to n5, and the operation in the flow n5→n6→n7→n8→n9→n10 is repeated. During this time the copying is carried out in the verso copying mode. In the case where it is detected in n7 that the verso copying mode is not selected, namely, the recto copying mode is selected, copy papers are supplied from the paper feeding cassette selected in n17. Similarly, it is detected in n9 as to the presence or absence of the paper jamming. If the paper jamming is not detected in n9, it is detected in n10 whether the copy papers are sent out to the intermediate tray. In the case where the copy papers are not sent out to the intermediate tray, the flow returns to n5 for repetition of the operation in the flow n5→n6→n7→n17→n9→n10. If the supply of copy papers is not completed in n6, the flow skips from n6 to n9. Then, at the stage where the copy papers are completely supplied, the flow proceeds to n7. If the copy papers are discharged to the intermediate tray or the paper discharge tray in n10, the counter Y in which the desired number of copies to be produced for the original document is set is decreased in n11, and it is detected in n12 whether the copying operation is effected for the set number of copies to be produced for the original document. When it is detected in n12 that the desired number of copies have been produced, the original document is replaced with a subsequent one in n13, and at the same time, the number X of copies to be produced with respect to the next original document is set both in the counter YDD and the counter Y. When it is detected in n14 that the copying operation for the set number of copies with respect to each of the original documents is completed, the flow goes to n15 in which it is detected whether the original document is set in the verso copying mode. Since it is in the recto copying mode at first, the flow goes to n22 where the copying mode is set to be the verso copying mode. The operation in the verso copying mode is conducted in the same manner as described above. After the verso copying mode is completed, the insufficient number of copies, if any, with respect to respective original documents is indicated in n16, thereby to complete the duplex copying operation. At the same time, the copying machine is brought back into the warming-up condition, waiting for a coming data to be inputted.

If the paper jamming is caused in the duplex copying operation as above, the jamming is detected in n9, with the flow proceeding to n18. When the paper jamming is removed in n18, it is detected in n19 whether the paper jamming is caused during the operation in the verso copying mode. In the case where the paper jamming is brought about in the operation under the recto copying mode, the flow goes to n21 where the content of the counter Y is kept remained, and the copying machine is returned into the operable condition. On the contrary, if the paper jamming is detected to be caused during the operation in the verso copying mode, the flow proceeds to n20, such that the content of the counter Y is set to be the content of the counter YDD. In n20, the counter Y indicates the remaining number of copies yet to be produced for the original document, while the counter YDD indicates the remaining number of copy papers to be supplied from the intermediate tray in the verso copying mode. Therefore, by reducing the value of the counter YDD from the value of the counter Y, the insufficient number Yn of copy papers to be copied per the original document (which is generally 1, and in the case where a plurality of copy papers are jammed, the number Yn becomes the number of the jammed papers) is calculated. Simultaneously with hits, which number is the original document Nn to be copied is written into RAM 43. Thereafter, it is returned back to the copying operation. Thus, when all of the original documents are completely copied in the verso copying mode, the value Yn calculated by the counters and the number Nn of the original document are indicated on the display of the operating part in n16.

The steps n19 and n20 correspond to the setting means for setting the content of the counters according to the present invention. Thus, in the aforementioned manner, the content of the counter Y which counts the remaining number of copies to be produced for one original document is set to the content of the counter YDD in the case where the paper jamming takes place during the operation in the verso copying mode, resulting in failure of operation in the verso copying mode.

Accordingly, even when the paper jamming is given rise to during the operation in the verso copying mode, the copying machine of the present invention is so adapted that the correct remaining number of copies to be produced is positively calculated by the counter Y. Therefore, when a plurality of original documents are copied one by one to produce the set number of respective copies, the present invention is advantageous in that the front face of the original document is copied onto the front faces of the set number of copy papers, and the reverse face of the original document is copied onto the reverse faces of the set number of copy papers, without inconsistency between the surfaces of the original document and of the copy papers.

Moreover, after the insufficient number Yn of copy papers to be copied with respect to the jam-detected original document is calculated, and at the same time the number Nn of this jam-detected original document is stored into RAM 43, thereby to complete the copying operation in n20, the numbers Yn and Nn are indicated in the display part of the operating section, with such a convenient result that an operator of the copying machine can promptly respond to the display for recovery after the copying operation.

Second Embodiment

Figure 8:
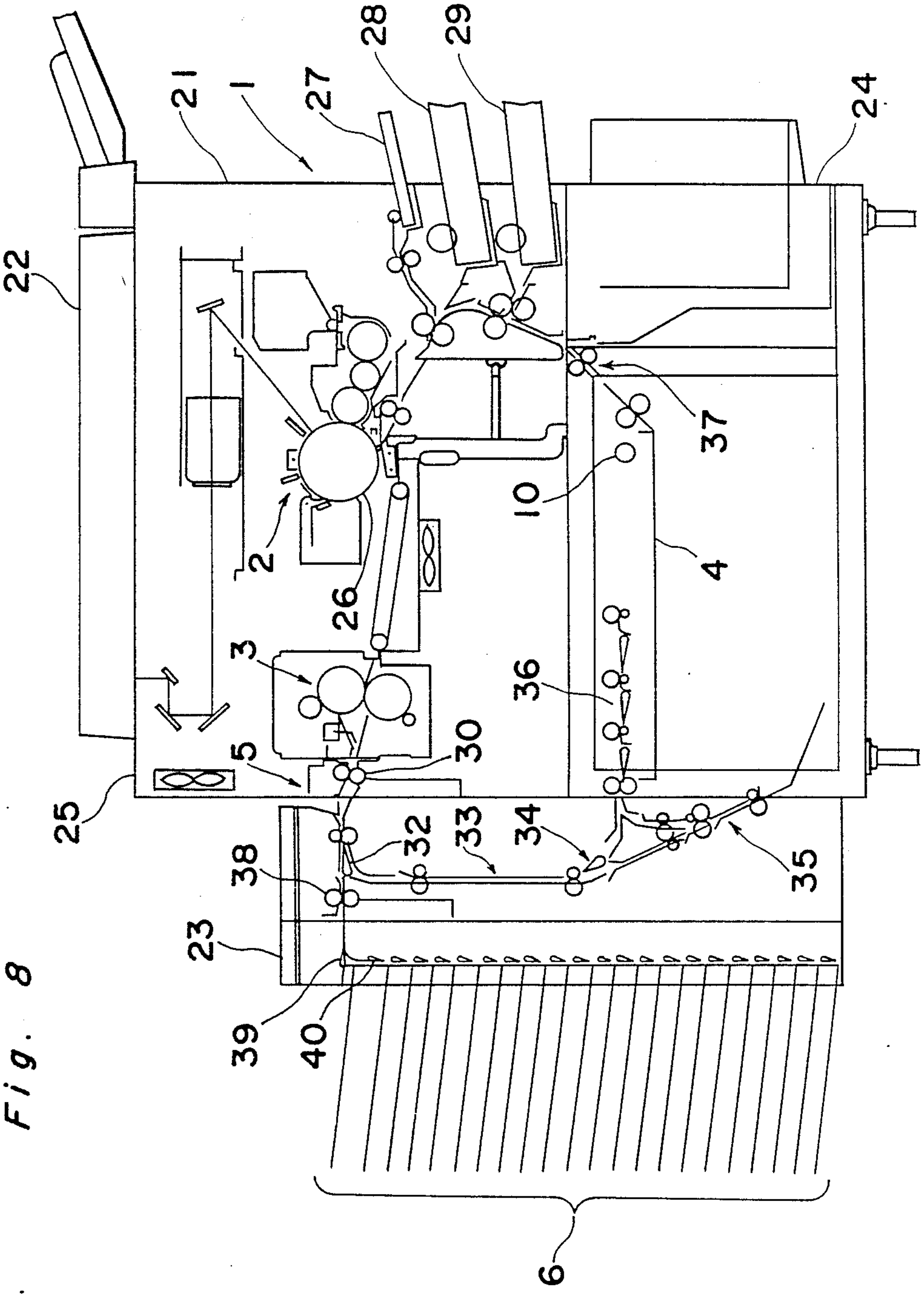
FIG. 8 is a view schematically showing the structure of the automatic duplex copying machine with the sorting unit of FIG. 6.

Referring to FIG. 8, the structure of an automatic duplex copying machine with a sorter according to a second embodiment of the present invention is schematically shown therein.

It is to be noted here that like components as in the first embodiment of FIG. 3 are designated by like reference numerals, the description of which will therefore be abbreviated here.

In the copying machine according to the second embodiment of the present invention, a copy paper discharged out of the paper discharge roller 30 in the paper discharge part is led to the paper transfer passage in the sorting unit 23. Moreover, at the left side of the sorter 23, 20 bins 6 are provided in layered form. Flappers 32 and 39 are provided in the transfer passage in the upper part of the sorter 23, the former flapper 32 leading the copy papers which are copied in the copy processing unit 2 in the recto copying mode under the duplex copying mode and discharged from the paper discharge part 5 to the transfer passage 33 in the sorter 23, and the latter flapper 39 sorting the copy papers into the uppermost bin and the other lower bins. Each bin has a flapper 40 provided at the entrance thereof. The flapper 40 is provided so as to transfer the copy papers into the respective corresponding bins.

The paper feeding roller 10 supplies the copy papers stored within the intermediate tray to the copy processing unit 2 in the verso copying mode or in the composite copying mode.

In the copying machine according to the second embodiment of the present invention, the verso copying mode is started after the recto copying mode operation with respect to all of the original documents is repeated successively by the set number of copies to be produced.

The copy papers are sequentially received into the respective bins 6 when the flappers 39 and 40 are controlled in accordance with either the sorting mode or the group mode preliminarily set in the control part (not shown). Either the sorting mode or the group mode is selected in the operating part (not shown) before start of the copying operation. When the sorting mode is selected, the copy papers are sequentially sorted into the 20 layered bins for every page. On the other hand, when the group mode is selected, the copy papers are sorted into the respective bins 6 by the set number for every original document. The sorter 23 is repeatedly controlled in the above-described manner on the basis of the set number of copies to be produced with respect to one original document. Furthermore, if the paper is jammed during the operation in the verso copying mode, the content of the first counter Y is set to that of the second counter YDD, and moreover, when the value of the first counter Y is zero, that is, when the remaining number of the verso copying operations for the one original document is zero, the selected bin is set at the home position in the sorter 23, or if the group mode is preliminarily selected, the selected bin is shifted to a next step.

Figure 9:
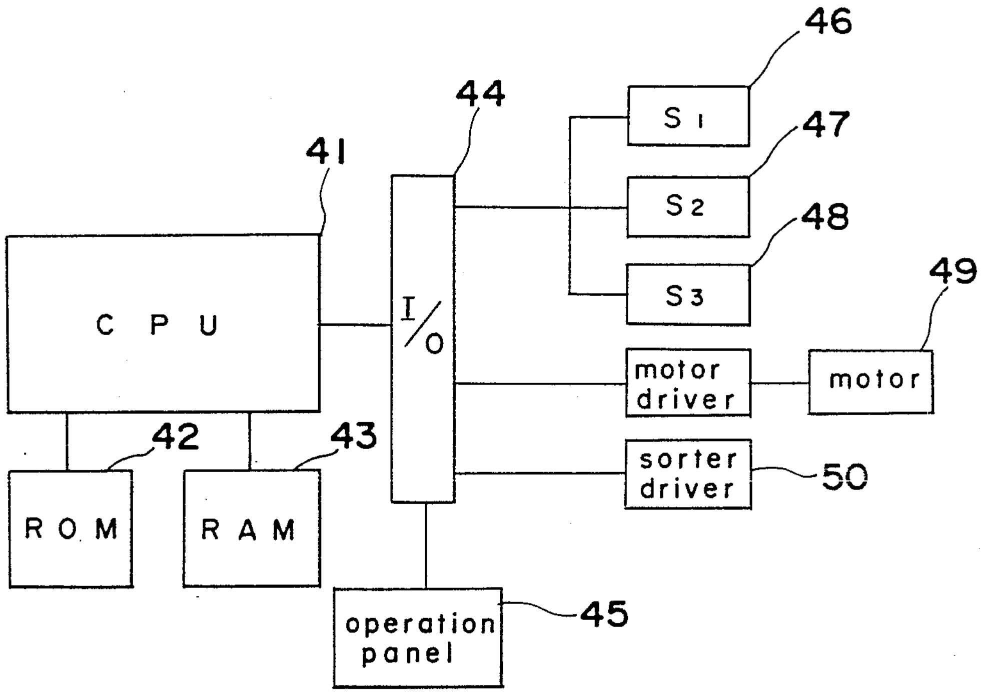
FIG. 9 is a block diagram of a control part of the copying machine of FIG. 8.

Referring to a block diagram of a control part of the copying machine shown in FIG. 9, the copying machine is controlled in its entirely by CPU 41. ROM 42 is preliminarily stored with the controlling program for CPU 41. RAM 43 is assigned with a flag for distinguishing the single copying mode and the duplex copying mode, or the recto copying mode and the verso copying mode in the duplex copying mode, or a flag for distinguishing the sorting mode and the group mode. Moreover, the RAM 43 is made use of for its working area.

The flappers 39 and 40 are controlled, in accordance with the sorting mode or the group mode selected through the operating panel, by a sorter driver 50 which distributes the copy papers into the respective bins.

Figure 10A:
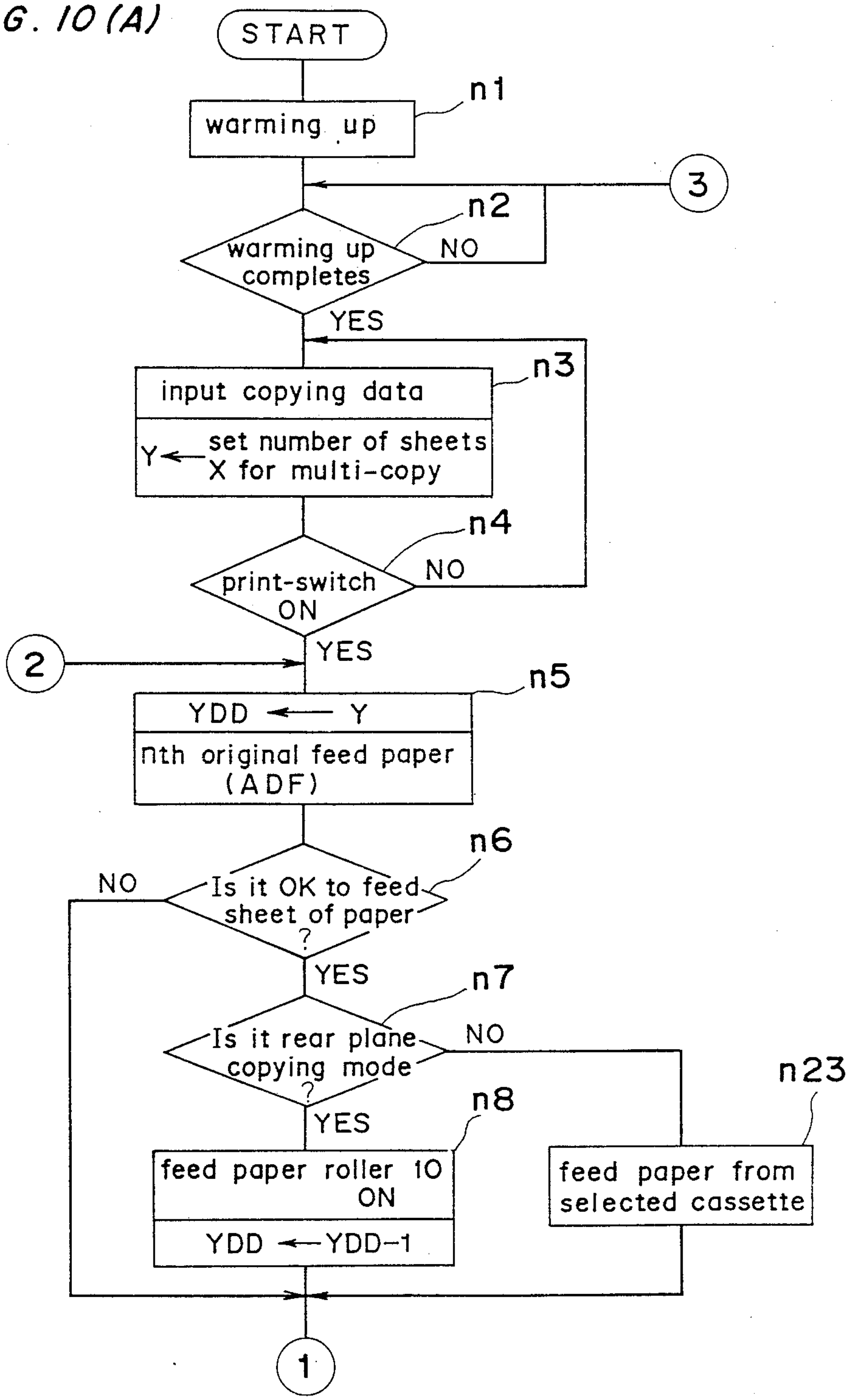
FIGS. 10(A), 10(B) and 10(C) are flow-charts showing the operation of the copying machine of FIG. 8.
Figure 10B:
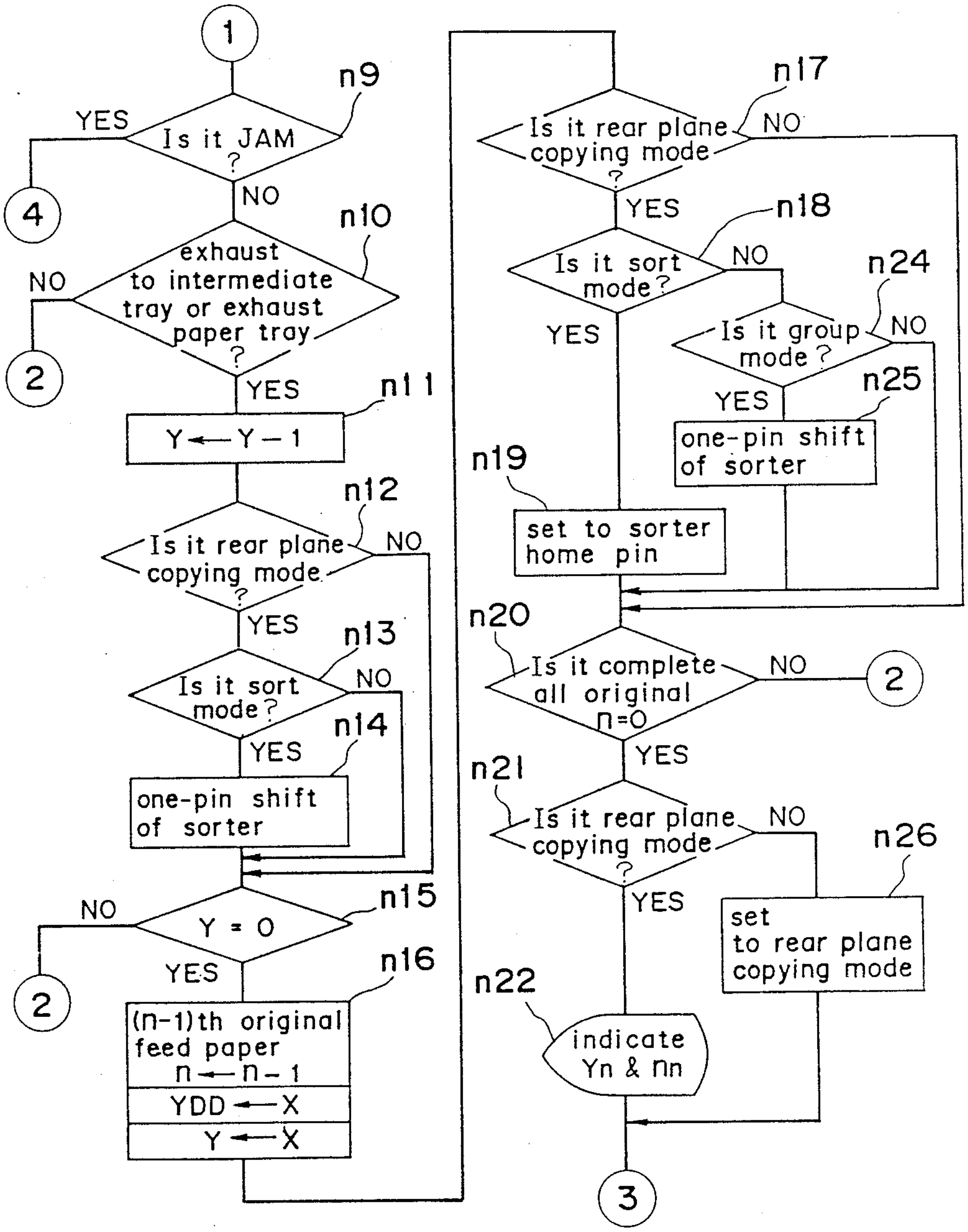
Figure 10C:
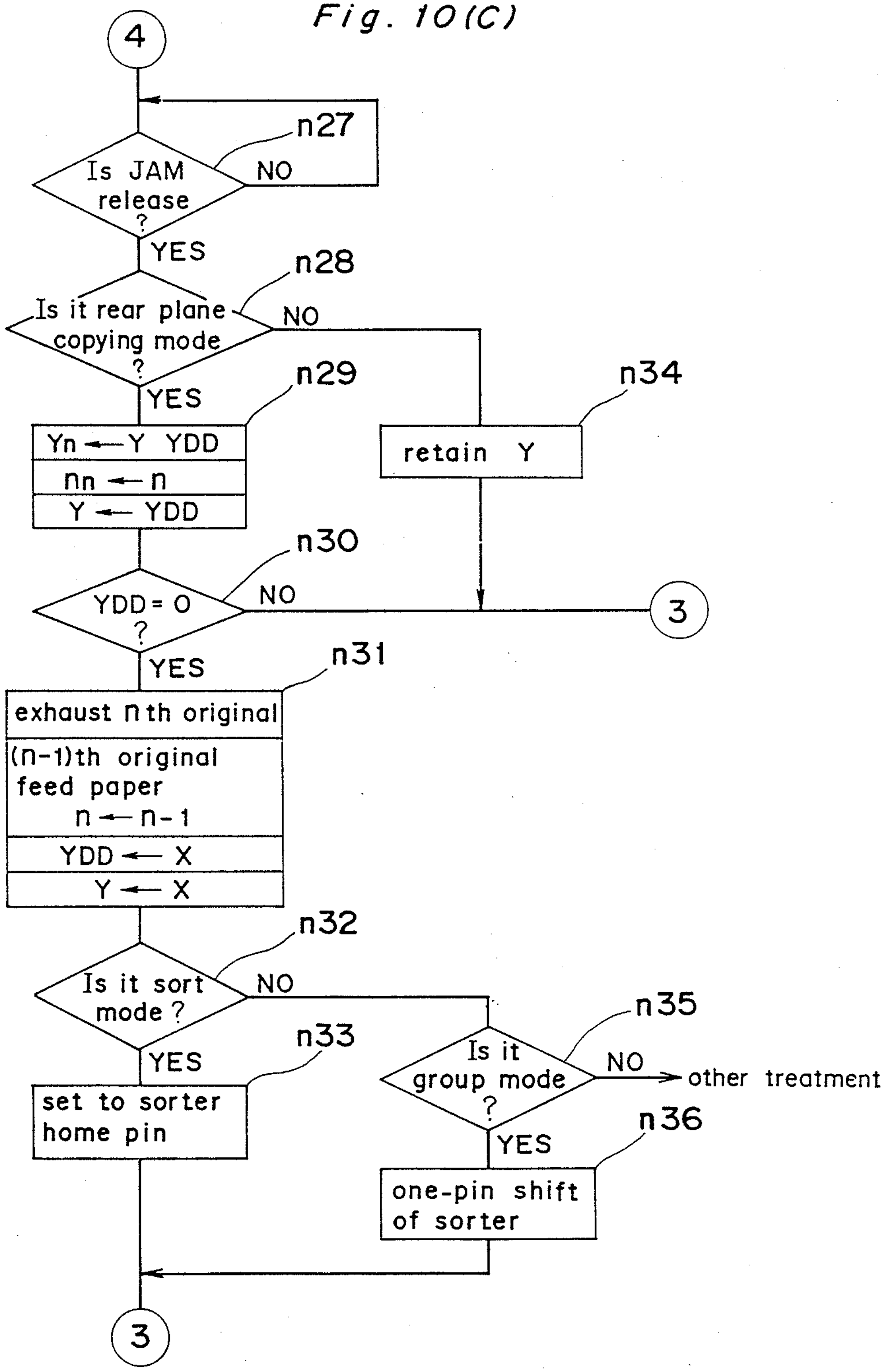

FIGS. 10(A), 10(B) and 10(C) are flow-charts representing the operation of the copying machine of the second embodiment in the duplex copying mode. In FIGS. 10(A), 10(B) and 10(C), like steps as in the flow-charts of FIGS. 5(A) and 5(B) are designated by like reference numerals, and the description thereof will be abbreviated here.

In n6, it is detected whether or not the copy papers are correctly supplied from the paper feeding part. If the papers are correctly supplied, the detection as to whether it is in the verso copying mode is carried out in n7. In the case where it is detected in n7 that the verso copying mode is not selected, that is, the recto copying mode is selected, the flow moves to n23 where the copy papers are supplied from the selected paper feeding cassette. At first the recto copying mode is practiced, and therefore the flow advances from n6→n7→n23 to n9. In n9 it is judged whether or not the paper jamming has occured. If the paper jamming is not detected in n9, the flow goes to n10. It is detected in n10 by the paper detection sensor 47 (S2) whether the copy papers are discharged to the intermediate tray. If the copy papers are not sent out to the intermediate tray, the flow returns to n5, thus repeating the operation in the flow sequence of n5→n6→n7→n23→n9→n10. When the copy papers having the front surfaces thereof copied are discharged to the intermediate tray during the copy operation, content of the counter Y in which the number of copies to be produced with respect to a predetermined original document is set is decreased in n11. And it is detected in n12 whether it is in the verso copying mode. In the case of the recto copying mode, the flow skips to n15 where it is detected whether the set number of copies have been completely produced. If the set number of copies have been produced, the flow goes to n16 in which the one original is exchanged with a next one, with the set number X for the next original document (N−1) being set in the counters Y and YDD. Thereafter, the above-described recto copying operation is repeated by the set number X.

Then, it is detected in n17 whether it is in the verso copying mode. The flow moves to n20 if in the recto copying mode. It is judged in n20 whether or not the set number of copies have been completely produced with respect to all of the original documents. In the case where the copying is completed with respect to all of the original documents, the flow goes to n21 and it is detected again in n21 whether it is in the verso copying mode. If it is detected to be in the recto copying mode, the verso copying mode is arranged in n26, and thereafter the flow goes back to n2. In n26, the recto copying mode is perfectly completed, thus starting the verso copying mode.

When the verso copying mode is started (the verso copying mode is selected), the operation is carried out in the same manner as in the recto copying mode, namely, in the order of n2→n3→n4→n5→n6. Since it is detected in n7 that it is in the verso copying mode, the flow proceeds to n8. In n8, the paper feeding roller 10 is driven to supply one sheet of copy paper stored in the intermediate tray 4, with simultaneous decrement of the content of the counter YDD. Then, the detection of the paper jamming is conducted in n9. With no paper jamming detected in n9, it is detected in n10 whether or not the copy papers copied onto the reverse faces thereof are discharged to the sorter 23. This detection is carried out by the sensor S1. If the reverse face copied papers are not discharged to the sorter 23, the operation in the flow n5→n6→n7→n8→n9→n10 is repeated. During the time, the copying operation in the verso copying mode is practiced. If it is so detected in n10 that the copy papers are discharged to the sorter 23, the content of the counter Y is reduced in n11. Then, in n12 it is detected whether the copying mode is the verso copying mode. In the case of the verso copying mode, it is detected in n13 whether the sorting mode is selected as the controlling mode for the sorter. The sorting mode is preliminarily set in the control part, and selected before start of the copying operation. In the sorting mode, the sorter 23 is controlled in n14 so as to shift the selected bin to a next step. Thereafter, it is judged in n15 whether or not the copying operation is carried out by the set number. If the copying operation is carried out by the set number, the flow goes to n16 where the original document is changed with a next original document, and the set number X of copies to be produced for the next original document is set in the counters Y and YDD. Then, after it is detected in n17 that the copying mode is the verso copying mode, the flow goes to n18 in which it is detected whether or not the sorting mode is selected as the controlling mode for the sorter. If the sorting mode is selected, the sorter is controlled so that the copy paper to be stored next is accommodated in the home bin. On the other hand, in the case where the group mode is selected which is judged in n24, the sorter is controlled in n25 to shift the selected bin to a next step. Thus, it is detected in n20 whether the copying operation by the set number of copies with respect to the particular original document in the manner as above is completely done. In the affirmation, the flow proceeds to n21 where it is detected whether the particular original document is in the verso copying mode. If the original document is in the verso copying mode, the insufficient number, if any, of copies to be produced for each original document is indicated in n22, thus completing the duplex copying operation. Simultaneously, the copying machine is returned into the warming-up condition, waiting for the next data to be inputted.

Further, it is detected in n30 whether the value of the counter Y is zero, namely, the remaining number of the set number is zero.

In the case where the remaining number of the set number is not zero, the value of the counter Y is set to that of the counter YDD, and then the copying operation is continued. When the verso copying operation is repeated until the remaining number of the set number is zero, the flow goes to n31 in which the original document N is discharged and, the next original document (N−1) is supplied to ADF. The set number X with respect to the original document (N−1) is set in the counters Y and YDD. Moreover, it is detected in n32 whether the controlling mode for the sorter is selected to be the sorting mode. If the sorting mode is selected, the sorter is controlled to be set such that the copy paper which should be accommodated next is accommodated in the home bin. On the contrary, if it is detected in n35 that the group mode is selected, the sorter is controlled in n36, thereby to shift the selected bin to the next step. After this, the copying operation with respect to the next original document is performed. When all of the original documents are completely finished in the verso copying mode as described above, the calculated value Yn and the Number Nn of the original document are indicated in the display of the operating part.

According to the second embodiment, as described above, the content of the counter Y which calculates the remaining number of copies yet to be produced for one original document is arranged to be set to the content of the counter YDD in the case where the paper jamming is detected during the operation in the verso copying mode, resulting in failure of the verso copying mode. Accordingly, even the paper jamming during the operation in the verso copying mode allows the counter Y to positively calculated the correct remaining number of copies. Therefore, even when a plurality of original documents are copied one by one by the set number each, no undesirable discordance between the face of the original document and that of the copy papers is generated. It is advantageous that the copying can be carried out in such manner that the front surface of the original document is copied in corresponding manner onto the front surface of the copy papers, and also the reverse surface of the original document can be copied in corresponding manner onto the reverse surfaces of the copy papers.

Moreover, in addition to the fact that the content of the counter Y is arranged to be set to the content of the counter YDD in the case of the paper jamming in the verso copying mode, when the value of the counter Y becomes 0, namely, the remaining number of copy papers to be copied in the verso copying mode with respect to one original document becomes zero, the sorter is arranged to set the selected bin at the home position if the sorting mode is preliminarily selected, or the sorter is arranged to shift the selected bin to the next step if the group mode is selected. Therefore, owing to the above-described arrangement, even in the case where the paper jamming is brought about in the course of the operation under the verso copying mode, it can be prevented that the copy papers for the next original document are received in the bin into which should have contained the jammed papers. The copy papers can be properly put in the respective bins for each original document in accordance with the sorting mode or the group mode, and the copy papers subsequent to the jammed paper can be positively stored in their respective bins.

As is described above, according to the present invention, the content of the first counter which calculates the remaining number of copies to be produced for each original document is, in the case where the paper is jammed during the operation in the verso copying mode, and the jammed paper is not copied in the verso copying mode, rendered to be the set value of the second counter which calculates the number of supply of copy papers from the intermediate tray. Therefore, even when the copy papers are not effected in the verso copying mode with respect to the particular original document by the set number because of the paper jamming, etc., the first counter calculates the set number of copies for the one original document in the same manner as in the case without the paper jamming. As a result, when a plurality of original documents are copied one by one each by the set number, there is never generated a discordance between the face of the original document and that of the copy papers, such that the front face of the original document can be positively copied onto the front face of the copy paper, and the reverse face of the original document can be positively copied onto the reverse face of the copy paper.

Furthermore, the remaining number of the set number of copies for one original document in the verso copying mode can be correctly calculated. At the same time, since the sorter can be positively controlled when the calculated value is "0", the duplex copied copy papers following the jammed papers can be advantageously put into the layered bins in accordance with the sorting mode or the group mode.

What is claimed is:

1. In an automatic duplex copying machine equipped with a sorter, which is so arranged as to perform, when documents are to be copied onto the corresponding front and reverse surfaces of copy papers, the recto copying mode in which the recto copying operation for copying document onto the front surface of a copy paper and storing the copied paper in an intermediate tray is repeated by the set number of copy papers to be copied per every original document, and the verso copying mode in which the verso copying operation for copying document onto the reverse surface of the copy paper stored in the intermediate tray and discharging the copied copy paper is repeated after completion of said recto copying mode by said set number of copy papers to be copied per every original document;

said automatic duplex copying machine being provided with a selecting means for selecting the sorting mode whereby the duplex-copied copy papers are sequentially sorted into layered bins per every page, or the group mode according to which the duplex-copied copy papers are sorted into said bins per every original document by the set number;

the improvement further including:

a first counter which calculates the remaining number of copy papers yet to be copied per each original document;

a second counter which calculates the remaining number of copy papers yet to be supplied from the intermediate tray during the operation in the verso copying mode;

a setting means which sets the content of said first counter to that of said second counter when the paper jamming takes place during the operation in the duplex copying mode; and another means which sets the selected bin at the home position in the case of the sorting mode, or shifts the selected bin to a next step in the case of the group mode, if the content of the second counter is zero when the content of the first counter is set to that of the second counter.

2. An automatic duplex copying machine comprising:

a recto copying mode for copying a first side of an original document onto a front surface of a copy paper;

an intermediate tray for storing said recto-copied copy paper, said recto copying mode copying and storing being repeated for each of a plurality of original documents by a set number of copies to be produced;

a verso copying mode for copying a second side of said original document onto a reverse surface of the copy paper stored in the intermediate tray and for discharging said verso copy, said verso copying operation being perfored upon completion of said recto copying operation for every original document and for said set number of copies to be produced;

a first counter for calculating a remaining number of said set number of copies to be produced for each original document;

a second counter for calculating a remaining number of a supply of copy papers from the intermediate tray in said verso copying mode; and means for setting the content of said first counter to that of said second counter when a paper jam occurs in said verso copying mode.

3. An automatic duplex copying machine according to claim 2, wherein said first counter remains constant if a paper jam occurs in said recto copying mode, said first counter resuming the count down upon removal of the paper jam.

* * * * *